(12) United States Patent
Oury et al.

(10) Patent No.: US 7,353,935 B2
(45) Date of Patent: Apr. 8, 2008

(54) CONVEYOR DISCHARGE DEVICE

(75) Inventors: Robert Oury, Gilberts, IL (US); Bruce Arndt, Algonquin, IL (US)

(73) Assignee: Rotec Industries, Inc., Elmhurst, IL (US)

( * ) Notice: Subject to any disclaimer, the term of this patent is extended or adjusted under 35 U.S.C. 154(b) by 12 days.

(21) Appl. No.: 11/361,718

(22) Filed: Feb. 23, 2006

(65) Prior Publication Data

US 2006/0201784 A1 Sep. 14, 2006

Related U.S. Application Data

(60) Provisional application No. 60/658,637, filed on Mar. 3, 2005.

(51) Int. Cl.
*B65G 17/36* (2006.01)
(52) U.S. Cl. .............. 198/550.02; 198/563; 193/25 C; 414/141.8
(58) Field of Classification Search ............... 198/508, 198/550.2, 563, 568; 193/2 R, 25 C, 4, 16; 414/141.8, 141.3, 141.4, 143.1, 140.9, 142.2
See application file for complete search history.

(56) References Cited

U.S. PATENT DOCUMENTS

| 975,312 | A | * | 11/1910 | Anderson ............... 198/550.2 |
| 3,184,041 | A | * | 5/1965 | Aydelott .................... 198/536 |
| 4,277,214 | A | * | 7/1981 | Mahle et al. ............ 414/141.8 |
| 4,631,125 | A | * | 12/1986 | Parks ........................ 198/563 |
| 5,601,181 | A | * | 2/1997 | Lindhorst ................ 193/25 R |
| 5,699,878 | A | | 12/1997 | Oury et al. |
| 5,762,179 | A | | 6/1998 | Oury et al. |
| 6,244,477 | B1 | * | 6/2001 | Hudelmaier ............. 193/25 C |
| 6,336,545 | B1 | | 1/2002 | Arndt et al. |

* cited by examiner

*Primary Examiner*—James R. Bidwell
(74) *Attorney, Agent, or Firm*—Pauley Petersen & Erickson

(57) ABSTRACT

A device for spreading aggregate material from a discharge conveyor onto a work surface includes a tremie attached relative to the discharge conveyor and a flexible hose connected to the tremie. A crank connected between the tremie and the discharge conveyor permits adjustment of a frequency and an amplitude of the tremie to provide a desired windrow of material on the surface. A distal end of the discharge conveyor is preferably moveable relative to a supply of material to further optimize the desired windrow of material.

19 Claims, 4 Drawing Sheets

US 7,353,935 B2

CONVEYOR DISCHARGE DEVICE

This application claims priority to U.S. provisional application 60/658,637 filed 3 Mar. 2005.

BACKGROUND OF THE INVENTION

1. Field of the Invention

This invention relates to a system and method for discharging material relative to a construction surface.

2. Description of Related Art

Dams, roads and similar large scale construction projects that require building up a surface in layers. Concrete and rock filled dams, large concrete pads and roads are traditionally constructed by hauling rocks and/or concrete from a blasting site, concrete plant or quarry to the construction site using large dump trucks and/or mixing trucks. In rock-filled dams, a bulldozer then spreads the rocks and rollers are used to compact the material until it reaches a specified density. Similarly, in concrete construction, a cantilevered trough pours the concrete until it reaches a desired level.

Bulldozers and trucks also typically prepare roads on the dam so that trucks can drive on successive layers safely and without damaging tires and suspensions. This process is costly and time consuming because numerous trucks are required to transport the material to the construction site. In some instances, traditional conveyors have also been used to transport the rocks and/or concrete to the dam site. Such conveyors traditionally discharge a windrow of material in front of other machines that, later on, spread the material over a much larger work area. Such conveyors traditionally use a fixed discharge device that results in a very narrow windrow of material.

SUMMARY OF THE INVENTION

This invention relates to a system and method for discharging material from a conveyor, crane, towerbelt, boom conveyor, PORT-O-BELT™ swinger or similar such equipment, particularly concrete and aggregate material handling equipment, necessary in large scale construction projects such as dams, embankments, landfills, land reclamation and similar such projects.

According to a preferred embodiment of this invention, a system for discharging material from a construction implement relative to a construction surface includes a device that imparts a variable frequency and/or oscillation motion to a conveyor discharge resulting in a pendulum motion of the discharge feed. One resulting benefit of this invention is a substantially larger windrow of material that allows the discharging machine or conveyor to move slowly and methodically, thus reducing operator workload.

According to a preferred embodiment of this invention, a tremie, similar to a funnel, is attached relative to a discharge conveyor, preferably via a pin connection that permits the tremie to swing, specifically so as to find a vertical orientation. Preferably, a large flexible hose, referred to as an "elephant trunk," is attached to the discharge end of the tremie. The flexible hose provides an extended discharge chute between the discharge conveyor and tremie and the discharge surface.

The subject invention preferably includes a device for providing an oscillating motion attached relative to the tremie. According to one preferred embodiment of this invention, both a frequency and an amplitude of the tremie, and thus the discharge flow, may be adjustable. Suitable applications for the subject invention include placement of roller compacted concrete on dams; placement of conventional concrete on slabs and roadways; and/or other suitable applications that require discharge and spreading of a high volume and of aggregate materials.

It is one object of this invention to discharge a large and uniform layer of material along a surface under construction. This and other objects of this invention will be apparent from the above and following description of the subject invention.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

As briefly described thus far, large scale construction projects such as dams, embankments, landfills, land reclamation, roadways and similar such projects typically require vast amounts of material distribution over very large areas. Examples of such material include roller compacted concrete, conventional concrete, gravel and/or other similar aggregate materials. Conveyors or similar construction implements are typically used to discharge a windrow of material, particularly high-weight, high-volume aggregate materials such as concrete or gravel, in front of other machines that, later on, spread the material over a much larger work area. Until this invention, conveyors have used a fixed discharge device that resulted in a very narrow windrow of material. Use of such a discharge device may result in a narrow windrow that forms discrete piles of material requiring intense spreading activity.

Figure 1:
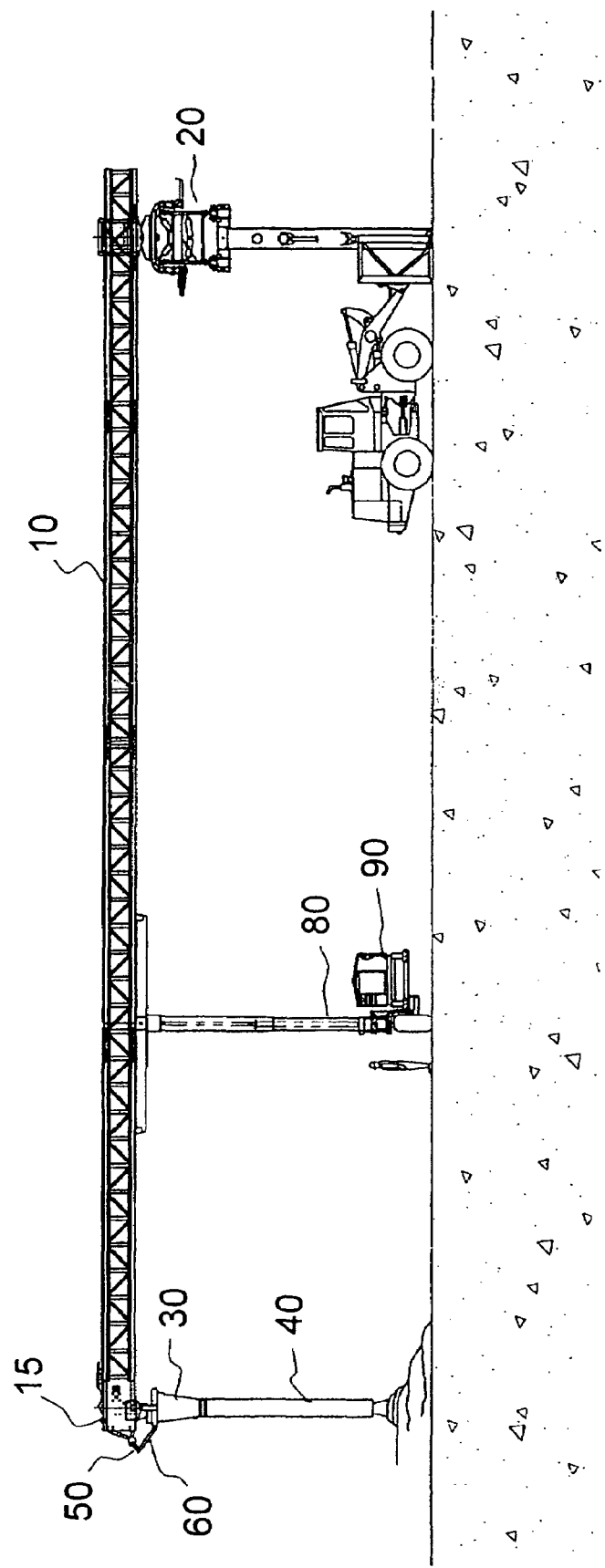
FIG. 1 is a side view of a construction site and a system for distributing material according to one preferred embodiment of this invention.
Figure 2:
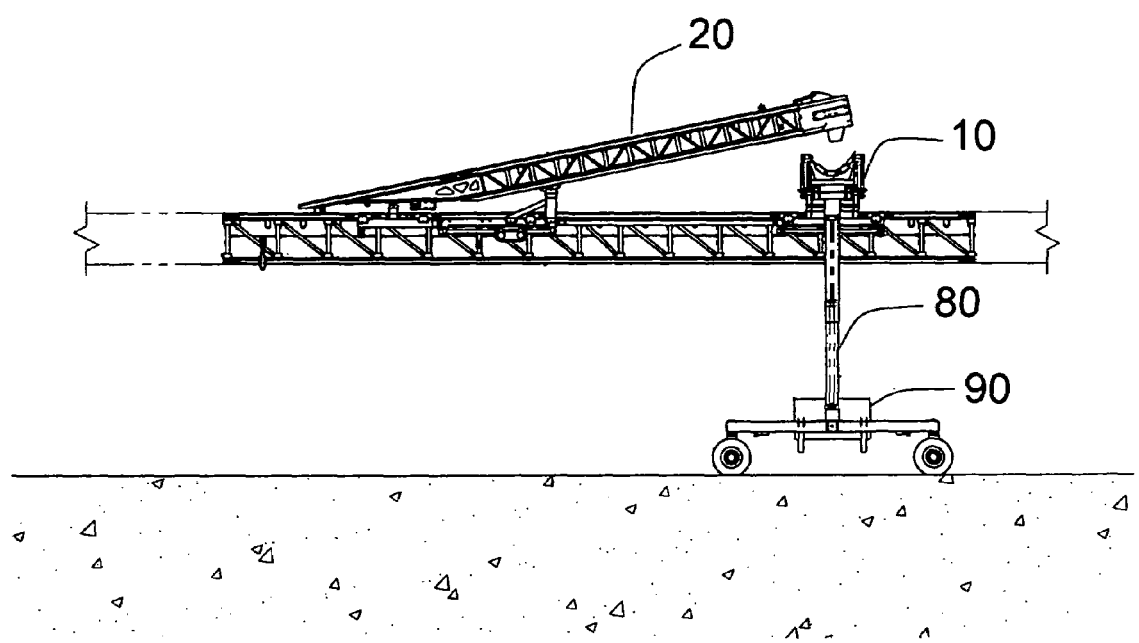
FIG. 2 shows a front view of a construction site and a portion of a system for distributing material according to one preferred embodiment of this invention.

In a typical application, such as shown in FIGS. 1 and 2, discharge conveyor 10 will extend transversely or arcuately across an area where the material is to be spread. In addition, tripper conveyor 20 typically supplies discharge conveyor 10 with material. Preferably, a distal end 15 of discharge conveyor 10 may be moveable relative to tripper conveyor 20 either laterally or arcuately. Discharge conveyor 10 is used to windrow stockpiles of material, such as rocks or concrete, along or around a span of the discharge conveyor. Using discharge conveyor 10 or similar construction implement, the centerline of material from the surface is necessarily built up higher as the project progresses.

Although the term "discharge conveyor" is used in the specification and claims herein, the term may include other construction implements such as cranes, towerbelts, boom conveyors, PORT-O-BELT swingers, cantilevered feed troughs or similar such equipment, particularly concrete and aggregate material handling equipment, suitable for large scale construction projects. As shown in FIGS. 1-6, the present invention includes a device that imparts an oscillating motion to a conveyor discharge resulting in a pendulum motion of the discharge feed. One resulting benefit of this invention is a substantially larger windrow of material that allows the discharging machine or conveyor to move slowly and methodically, thus reducing operator workload.

Figure 3:
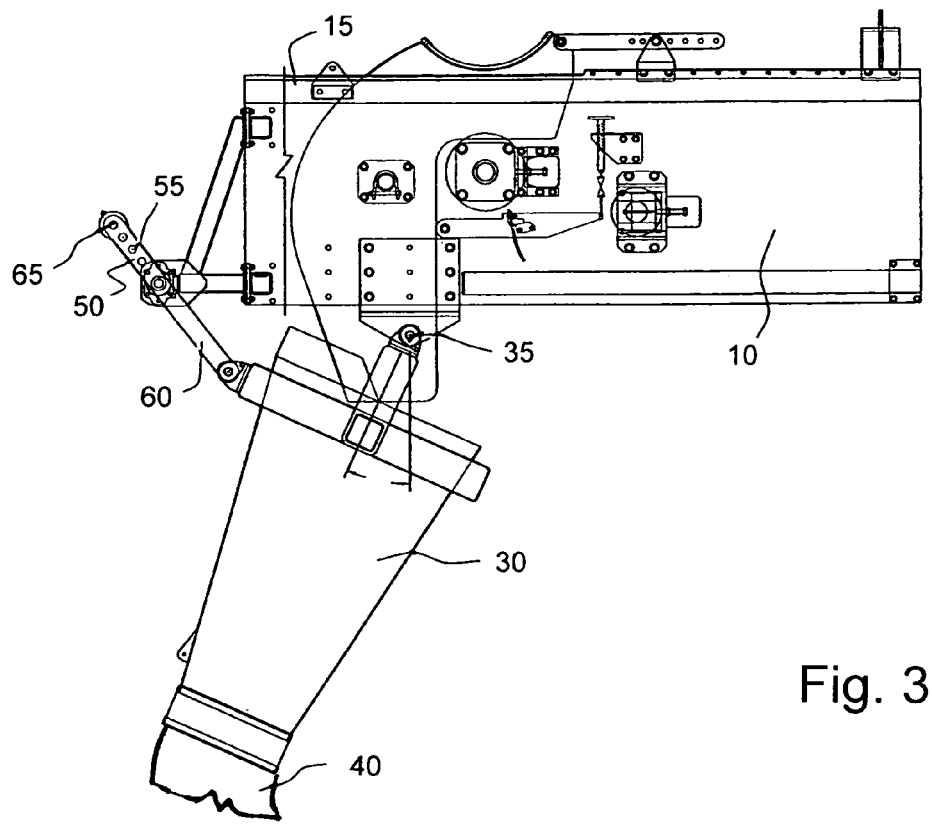
FIG. 3 is a side view of a conveyor discharge device in a first position according to one preferred embodiment of the invention.
Figure 4:
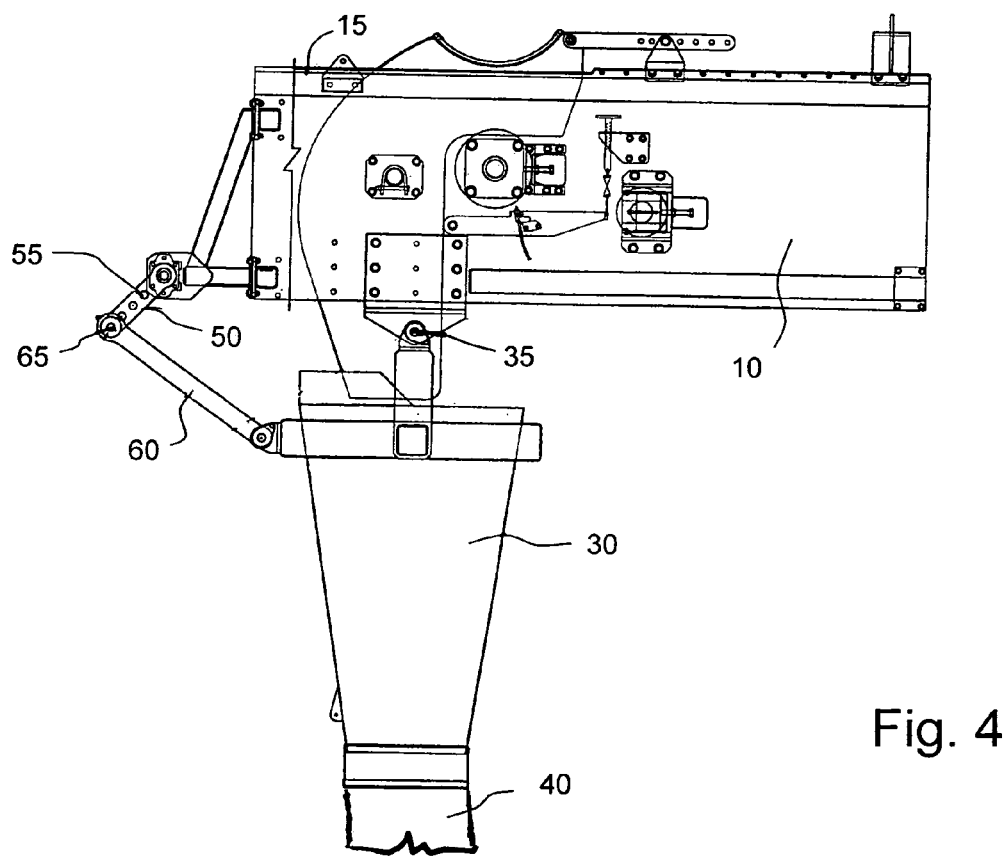
FIG. 4 is a side view of the conveyor discharge device shown in FIG. 3, in a second, or static, position.
Figure 5:
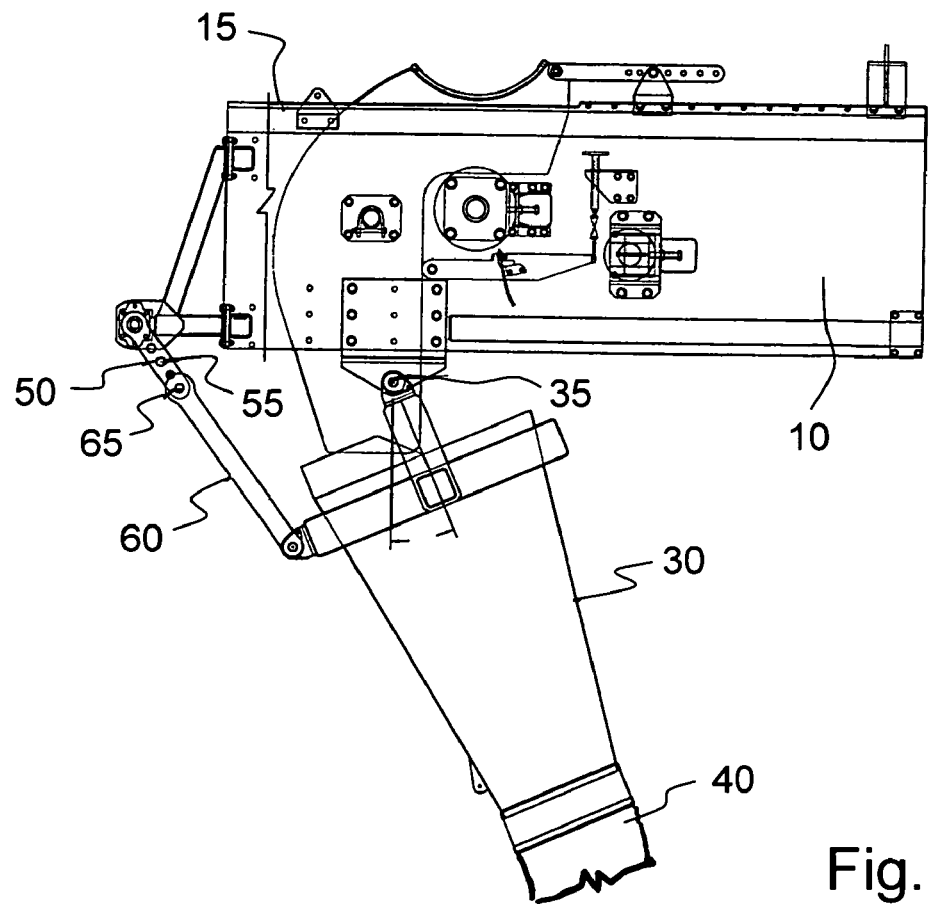
FIG. 5 is a side view of the conveyor discharge device shown in FIG. 3, in a third position.

According to a preferred embodiment of the invention, and as best shown in FIGS. 3-5, a device for spreading aggregate material from discharge conveyor 10 onto a surface includes tremie 30 attached relative to discharge conveyor 10. Tremie 30 is preferably a generally funnel-shaped device that is connected with respect to discharge conveyor 10, preferably in a manner to permit tremie 30 to freely swing relative to discharge conveyor 10. According to one preferred embodiment of this invention, pin 35 connects tremie 30 to discharge conveyor 10 and permits tremie 30 to maintain a generally vertical position relative to the ground when at rest or static but swing relative to discharge conveyor 10 when an external force is applied.

In addition, flexible hose 40 is preferably connected with respect to a discharge end of tremie 30. Flexible hose 40, also referred to as an "elephant trunk," may be constructed of a flexible and durable material capable of withstanding high through volumes of aggregate material. In a static state, flexible hose preferably follows the orientation of tremie 30 and is generally vertical with respect to the ground. Flexible hose 40 provides an extended discharge chute between discharge conveyor 10 and the work surface and/or ground.

The subject invention preferably includes a device for providing an oscillating motion attached relative to tremie 30. The device for providing the oscillating motion may comprise, as best shown in FIGS. 3-6, crank 50 rotatably connected relative to motor 70. According to a preferred embodiment of this invention, crank 50 is connected between tremie 30 and discharge conveyor 10 so that both a frequency and an amplitude of tremie 30 are adjustable. Crank 50 is preferably journaled or spindled with respect to motor 70 which provides a rotational input that crank 50 translates to a reciprocating motion to tremie 30.

Crank 50 may be further connected with respect to spindle 65 and link 60 which is pinned or otherwise pivotally connected with respect to tremie 30. Crank 50 may be connected with tremie 30 through link 60 such as shown in FIGS. 3-6. According to a preferred embodiment of this invention, a plurality of adjustment apertures 55 are formed in crank 50 and link 60 may be adjustable among the plurality of adjustment apertures 55. As a result, the plurality of adjustment apertures 55 may be spaced to adjust an amplitude of the flexible hose in known increments, such as in 5 degree increments.

According to one preferred embodiment of this invention, both a frequency and an amplitude of tremie 30, and thus the discharge flow, may be adjustable. Such variable control is described in more detail below.

Variable Frequency

Figure 6:
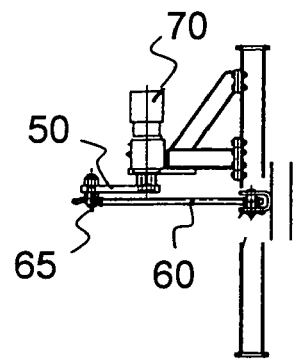
FIG. 6 is a top view of a crank used in connection with a conveyor device according to one preferred embodiment of this invention.

According to a preferred embodiment of this invention, the frequency of the subject device may be controlled by adjusting or controlling a flow of hydraulic oil to a variable speed motor, such as motor 70 shown in FIG. 6. Such flow may have an infinitely variable speed resulting in the ability to tune the frequency using the hydraulic drive system.

According to one preferred embodiment of this invention, the resulting frequency is preferably less than approximately 30 cycles/minute. As a result, the discharge device, specifically flexible hose 40, may be adjusted to oscillate at or near its natural frequency. In general, as flexible hose 40 increases in the length, its natural frequency decreases and thus the dialed-in frequency set using the hydraulic drive system may be reduced.

Variable Amplitude

The amplitude of the device may be controlled by adjusting a relative position of link 60 relative to crank 50. As described above and as shown in FIGS. 3-5, crank 50 may include a plurality of adjustment apertures 55 through which spindle 65 may be inserted. These adjustment apertures 55 may be spaced in a way to provide adjustable amplitude through a predetermined range, for instance, an adjustability between 10 degrees and 25 degrees, in 5 degree increments. Such amplitude adjustability permits a variable amplitude of oscillation. As a result, the discharge device may provide a suitable windrow width to meet specific requirements. A preferable windrow width is approximately 2-3 meters wide.

As briefly described above, discharge conveyor 10, such as a screw conveyor, a belt conveyor, a chain conveyor or any other device for conveying volumes of material, may be used in connection with the subject invention, specifically upstream of tremie 30 so as to discharge volumes of material through tremie 30 and flexible hose 40 in an oscillating manner.

According to one preferred embodiment of this invention, a system such as shown in FIGS. 1 and 2 may used to spread material quickly, accurately and efficiently. As best shown in FIGS. 1 and 2, discharge conveyor 10, also called a "placing conveyor," may extend between a position directly adjacent tripper conveyor 20 to a position away from tripper conveyor 20 and move relative to a discharge end of tripper conveyor 20. For instance, discharge conveyor 10 may be positioned on a moveable undercarriage 80 so as to move laterally along tripper conveyor 20 between each distal end of tripper conveyor 20. According to one preferred embodiment of this invention, undercarriage 80 may be wheeled and may move in a direction parallel to tripper conveyor 20 and/or in a generally arcuate path relative to tripper conveyor 20. Such range of motion permits discharge conveyor 10 to effectively cover all areas forward of tripper conveyor 10 in a predictable, consistent layer of material. Each of the adjustable features of the subject invention may be controlled remote control, either wired or wireless. For instance, a remote control (not shown) may be positioned in communication with discharge conveyor 10 and/or undercarriage 80 for remote operation of movement of discharge conveyor 10. In addition, undercarriage 80 may further house or accommodate a power unit 90 for providing power to discharge conveyor 10.

As such, according to a preferred embodiment of this invention, tripper conveyor 20 provides a supply of material to discharge conveyor 10 that is positioned to accept the supply of material, such as shown in FIG. 1. Once material flows from discharge conveyor 10, undercarriage 80 attached to discharge conveyor 10 moves a distal end 15 of discharge conveyor 10 relative to tripper conveyor 20, either laterally so that discharge conveyor 10 is moveable linearly along tripper conveyor 20 or arcuately so that discharge conveyor 10 is rotatable about a center axis.

In addition, tremie 30 is attached relative to the distal end 15 of discharge conveyor 10 and includes flexible hose 40 and a device that permits adjustment of both a frequency and an amplitude of tremie 30. As a result, the distal end of discharge conveyor 10 moves relative to the work surface and flexible hose 40 moves relative to the distal end 15 of discharge conveyor 10 thereby creating a controllable and desirable windrow of material on the work surface.

Suitable applications for the subject invention include placement of roller compacted concrete on dams; placement of conventional concrete on slabs and roadways; and/or other suitable applications that require discharge and spreading of a high volume and of aggregate materials.

While in the foregoing specification this invention has been described in relation to certain preferred embodiments thereof, and many details have been set forth for purpose of illustration, it will be apparent to those skilled in the art that the system and method according to this invention are susceptible to additional embodiments and that certain of the details described herein can be varied considerably without departing from the basic principles of the invention.

We claim:

1. A device for spreading aggregate material from a discharge conveyor onto a surface, the device comprising:
   a tremie attached relative to the discharge conveyor;
   a flexible hose connected to the tremie; and
   a crank connected between the tremie and the discharge conveyor so that both a frequency and an amplitude of the tremie are adjustable;
   a plurality of adjustment apertures formed in the crank; and
   a link connected between the crank and the tremie, the link adjustable among the plurality of adjustment apertures.

2. The device of claim 1 further comprising:
   a pin connecting the tremie to the discharge conveyor, the pin permitting the tremie to swing relative to the discharge conveyor.

3. The device of claim 1 wherein the plurality of adjustment apertures are spaced to adjust an amplitude of the flexible hose in known increments.

4. The device of claim 1 further comprising:
   a variable speed motor connected with the crank.

5. The device of claim 1 wherein the tremie is vertical with respect to the surface in a static condition.

6. A device for spreading aggregate material from a discharge conveyor onto a surface, the device comprising:
   a tremie attached relative to the discharge conveyor;
   a flexible hose connected to the tremie;
   a crank connected between the tremie and the discharge conveyor so that both a frequency and an amplitude of the tremie are adjustable; and
   an undercarriage supporting the discharge conveyor, wherein the discharge conveyor is moveable on the undercarriage.

7. The device of claim 6 wherein the undercarriage further comprises:
   a power unit connected with respect to the discharge conveyor.

8. The device of claim 6 further comprising:
   a remote control in communication with the discharge conveyor for remote operation of movement of the discharge conveyor.

9. The device of claim 1 wherein the discharge conveyor is rotatable about a center axis.

10. A device for spreading aggregate material from a discharge conveyor onto a surface, the device comprising:
    a tremie attached relative to the discharge conveyor;
    a flexible hose connected to the tremie;
    a crank connected between the tremie and the discharge conveyor so that both a frequency and an amplitude of the tremie are adjustable; and
    the discharge conveyor is moveable along a tripper conveyor.

11. The device of claim 1 wherein the discharge conveyor comprises at least one of a screw conveyor, a belt conveyor and a chain conveyor.

12. A device for spreading material onto a surface, the device comprising:
    a tripper conveyor providing a supply of material;
    a discharge conveyor positioned relative to the tripper conveyor to accept the supply of material;
    an undercarriage attached to the discharge conveyor, the undercarriage moving a distal end of the discharge conveyor relative to the tripper conveyor;
    a tremie attached relative to the distal end of the discharge conveyor;
    a flexible hose connected to the tremie; and
    a crank connected to the tremie so that both a frequency and an amplitude of the tremie are adjustable.

13. The device of claim 12 wherein a proximate end of the discharge conveyor is connected with respect to the tripper conveyor so that the distal end of the discharge conveyor is moveable in a generally arcuate path.

14. The device of claim 12 wherein a proximate end of the discharge conveyor is moveable with respect to the tripper conveyor so that the distal end of the discharge conveyor is moveable in a generally linear path.

15. The device of claim 12 further comprising:
    a variable speed motor connected to the crank.

16. The device of claim 12 further comprising:
    a plurality of adjustment apertures formed in the crank; and
    a link connected between the crank and the tremie, the link adjustable among the plurality of adjustment apertures.

17. A method of spreading bulk material on a surface comprising:
    moving a discharge conveyor relative to a tripper conveyor;
    providing a tremie at a distal end of the discharge conveyor;
    extending a flexible hose from the tremie;
    adjusting a frequency and oscillation of the tremie to provide a desired windrow of bulk material on the surface.

18. The method of claim 17 further comprising the step of:
    attaching a crank with respect to the tremie with a link;
    moving the tremie with a variable speed motor attached to the crank;
    adjusting a position of the link on the crank to provide a desired oscillation.

19. The method of claim 18 further comprising:
    adjusting a speed of rotation of the crank to provide a desired frequency.

* * * * *